United States Patent [19]

Holt et al.

[11] Patent Number: 5,771,378
[45] Date of Patent: Jun. 23, 1998

[54] ASSOCIATIVE TEXT SEARCH AND RETRIEVAL SYSTEM HAVING A TABLE INDICATING WORD POSITION IN PHRASES

[75] Inventors: John Holt, Centerville; David James Miller, Spring Valley; X. Allan Lu, Springboro; Ray Daley; Minh Doan, both of Dayton; Richard G. Graham, Beavercreek; Catherine Leininger, Dayton; Darin W. McBeath, Miamisburg; Thomas Pease, Mason; Stephen M. Sever, Kettering; Dale Waddell; Franz Weckesser, both of Dayton, all of Ohio

[73] Assignee: Reed Elsevier, Inc., Newton, Mass.

[21] Appl. No.: 473,824

[22] Filed: Jun. 7, 1995

Related U.S. Application Data

[63] Continuation of Ser. No. 155,304, Nov. 22, 1993.

[51] Int. Cl.$^6$ .............................. G06F 17/30; G06F 17/21
[52] U.S. Cl. .......................... 395/605; 395/792; 395/793; 395/759; 395/760; 395/606; 395/603
[58] Field of Search ..................................... 395/605, 792, 395/793, 603, 606, 795, 760; 364/419.19

[56] References Cited

U.S. PATENT DOCUMENTS

| | | | |
|---|---|---|---|
| 4,241,402 | 12/1980 | Mayper, Jr. et al. ................... | 364/200 |
| 4,270,182 | 5/1981 | Asija ....................................... | 364/900 |
| 4,358,824 | 11/1982 | Glickman et al. ...................... | 364/200 |
| 4,384,329 | 5/1983 | Rosenbaum et al. ................... | 364/300 |
| 4,471,459 | 9/1984 | Dickinson et al. ..................... | 364/900 |
| 4,499,553 | 2/1985 | Dickinson et al. ..................... | 364/900 |
| 4,554,631 | 11/1985 | Reddington ............................. | 364/900 |
| 4,580,218 | 4/1986 | Raye ....................................... | 364/300 |
| 4,688,195 | 8/1987 | Thompson et al. ..................... | 364/300 |
| 4,706,212 | 11/1987 | Toma ...................................... | 364/900 |
| 4,760,528 | 7/1988 | Levin . | |
| 4,787,035 | 11/1988 | Bourne ................................... | 364/300 |
| 4,819,156 | 4/1989 | De Lorme et al. ................. | 395/182.13 |
| 4,823,306 | 4/1989 | Barbic et al. ............................ | 364/900 |
| 4,839,853 | 6/1989 | Deerwester et al. .................... | 364/900 |
| 4,852,003 | 7/1989 | Zamora . | |
| 4,862,408 | 8/1989 | Zamora .................................. | 364/900 |

(List continued on next page.)

FOREIGN PATENT DOCUMENTS

WO 92/04681   3/1992   WIPO .

OTHER PUBLICATIONS

Wong, Wai Yee Peter, et al., "Implementations of Partial Document Ranking Using Inverted Files," *Information Processing & Management*, (Great Britain), vol. 29, No. 5, pp. 647–669, 1991.

Robert F. Jack, "Essential Guide to the Library IBM PC, vol. 4, Data Communications: Going Online", *Merkler Corp.* ©1987, pp. 62–67.

(List continued on next page.)

*Primary Examiner*—Gail O. Hayes
*Assistant Examiner*—Joseph Thomas
*Attorney, Agent, or Firm*—Reid & Priest LLP

[57] ABSTRACT

An associative text search and retrieval system uses one or more front end processors to interacting with a network having one or more user terminals connected thereto to allow a user to provide information to the system and receive information from the system. The system also includes storage for a plurality of text documents, and at least one processor, coupled to the front end processors and the document storage. The processor(s) search the text documents according to a search request provided by the user and provide to the front end processor a predetermined number of retrieved documents containing at least one term of the search request. The retrieved documents have higher ranks than documents not provided to the front end processor. The ranks are calculated using a formula that varies according to the square of the frequency in each of the text documents of each of the search terms.

15 Claims, 12 Drawing Sheets

U.S. PATENT DOCUMENTS

| | | | |
|---|---|---|---|
| 4,868,750 | 9/1989 | Kucera et al. | 364/419 |
| 4,914,590 | 4/1990 | Loatman et al. | 364/419 |
| 4,918,588 | 4/1990 | Barrett et al. | 364/200 |
| 4,931,935 | 6/1990 | Ohira et al. | 364/419 |
| 4,965,763 | 10/1990 | Zamora . | |
| 4,972,349 | 11/1990 | Kleinberger | 364/900 |
| 4,974,191 | 11/1990 | Amirghodsi et al. | 364/900 |
| 4,991,087 | 2/1991 | Burkowski et al. | 364/200 |
| 4,991,094 | 2/1991 | Fagan et al. . | |
| 5,005,127 | 4/1991 | Kugimiya et al. . | |
| 5,099,425 | 3/1992 | Yuji et al. | 364/419 |
| 5,109,509 | 4/1992 | Katayama et al. | 395/600 |
| 5,117,349 | 5/1992 | Tirfling et al. | 395/600 |
| 5,123,103 | 6/1992 | Ohtaki et al. | 395/600 |
| 5,265,065 | 11/1993 | Turtle | 395/600 |
| 5,321,833 | 6/1994 | Chang et al. | 395/605 |
| 5,323,316 | 6/1994 | Kadashevich et al. | 364/419 |
| 5,544,352 | 8/1996 | Egger | 395/605 |

OTHER PUBLICATIONS

Vu/Text®User Guide, A Knight Ridder Company, Aug. 1989 Chapter 7, p. 7.11.

Save™Retrieval Guide,. Jun. 1, 1990, pp. 12–17 of Chapter 12.

Dialog OnDisc User's Guide, Dialog Information Services, Inc.,©1987, pp. E–4 & E–5.

Dialog File 410, Acc. # 00035496: "New Full–Text Features in McGraw–Hill . . ." published Nov. 1968.

Dialog File 410, Acc, # 00044457: "KWIC and Hilight: How and When," published May 1988.

Croft, et al., "A Retrieval Model Incorporating Hypertext Links," *Hypertext '89 Proceedings,* Association for Computer Machinery, pp. 213–224 (Nov., 1989).

Turtle, et al., "Inference Networks for Document Retrieval," *Coins Technical Report 90–07,* University of Massachusetts, pp. 1–16, (Mar., 1990).

Turtle, et al., "Inference Networks for Document Retrieval," *Sigir 90,* Association for Computer Machinery, pp. 1–24 (Sep., 1990).

Turtle, "Inference Network for Document Retrieval," Ph. D. Dissertation, *Coins Technical Report 90–92,* University of Massachusetts (Feb., 1991).

Turtle, et al., "Efficient Probabilistic Inference for Text Retrieval," *RIAO '91 Conference Proceedings,* Recherche d'Information Assistee' par Ordinateur, Universitat Autonsma de Burcelona, Spain, pp. 644–661 (Apr., 1991).

Porter, "An Algorithm for Suffix Stripping," *Program,* vol. 14, pp. 130–137 (1980).

Turtle, et al., "Evaluation of an Inference Network–Based Retrieval Model," *Transactions on Information Systems,* Association for Computer Machinery, vol. 9, No. 3, pp. 187–222 (Jul., 1991).

Croft, et al., "Interactive Retrieval for Complex Documents," *Information Proceeding and Management,* vol. 26, No. 5, pp. 593–613 (1990).

Haynes, "Describing a System for the Specialized User: A Case Study," *Proceedings—1985 National Online Meeting,* Learned Information, Inc., pp. 205–213 (Apr. 30, 1985).

"Text Search and Retrieval Reference Manual for the Automated Patent System (APS)," U.S. Department of Commerce, pp. 1–5, 3–2 to 3–3, 3–8 to 3–9, 3–157–1 to 7–7, 7–35 to 7–37 (Oct. 21, 1992).

"Text Search and Retrieval Training Manual for the Automated Patent System (APS)," U.S. Department of Commerce, pp. 28, 29, 39–43 (Oct. 21, 1992).

```
                           SEARCH OPTIONS
Press ENTER to send search.
To use a Search Option, enter an equal sign followed by the number.

Search Description:
WHAT DIFFERENT METHODS OF "USABILITY TESTING" AND TQM ARE USED
BY SOFTWARE DEVELOPMENT COMPANIES?      112a Mandatory: "USABILITY TESTING", TQM
                        122
                        ┌114                              110
<=1>  Enter/Edit Mandatory Terms    ┌115
<=2>  Enter/Edit Restrictions  (e.g., date)
<=3>  Thesaurus ┌116
<=4>  Edit Search Description ┌117
<=5>  Change number of documents  Current setting: 25 ┌118

For further explanation, press the H key (for HELP) and then the ENTER key.
```

FIG. 8

```
=1                       SEARCH RESTRICTIONS

To use restrictions, enter an equal sign followed by the number.
   Press ENTER to return to Search Options.

┌132
<=1>  DATE:              Example: after 6/6/1993
         ┌133
<=2>  COURT:             Example: Sixth Circuit              130
          ┌134
<=3>  JUDGE:             Example: Rehnquist
         ┌135
<=4>  COUNSEL:           Example: Gerry
         ┌136
<=5>  NAME:              Example: Brown and Topeka Board of Education For further explanation, press the H key (for HELP) and then the ENTER key.
```

FIG. 9

```
                        SEARCH OPTIONS

Press ENTER to send search.
To use a Search Option, enter an equal sign followed by the number.

Search Description:
WHAT DIFFERENT METHODS OF "USABILITY TESTING" AND TQM ARE USED
BY SOFTWARE DEVELOPMENT COMPANIES?         112a Restrictions: DATE (AFT 10/1/92), COURT (SIXTH CIRCUIT)
              142
                                    114
<=1>  Enter/Edit Mandatory Terms        115                    110
<=2>  Enter/Edit Restrictions (e.g., date)
<=3>  Thesaurus   116
<=4>  Edit Search Description    117
                                              118
<=5>  Change number of documents  Current setting: 25

For further explanation, press the H key (for HELP) and then the ENTER key.
```

FIG. 10

```
                        SEARCH OPTIONS

Press ENTER to send search.
To use a Search Option, enter an equal sign followed by the number.

Search Description:
WHAT DIFFERENT METHODS OF "USABILITY TESTING" AND TQM ARE USED
BY SOFTWARE DEVELOPMENT COMPANIES?
                                                       112a
Mandatory:    "USABILITY TESTING", TQM   122

Restrictions: DATE (AFT 10/1/92), COURT (SIXTH CIRCUIT)
                                    114          142
<=1>  Enter/Edit Mandatory Terms        115                    110
<=2>  Enter/Edit Restrictions (e.g., date)
<=3>  Thesaurus   116
                                 117
<=4>  Edit Search Description
                                              118
<=5>  Change number of documents  Current setting: 25

For further explanation, press the H key (for HELP) and then the ENTER key.
```

FIG. 11

```
1, 2, 3, 6-10
SEARCH TERMS FOUND IN THESAURUS
                                    ⌐154
Enter term numbers to view synonyms. Example: 1, 2, 3, 6-10          150

<=1>  Return to Search Options 12345678901234567890123456789012345678901234567890123456789012345678901234567890123
   2  Usable              15  Piaget              28  Andretti
   3  TQM                 16  Norman              29  Winograd
   4  Models              17  Carroll             30  Newell
   5  Algorithms          18  Cognitive           31  Shank
   6  Graphics            19  Metaphysical        32  Feigenbaum
   7  Chomskian           20  Metamorphosis       33  Hypoturbocharged
   8  Transformational    21  Carburator          35  Knowledge
   9  Grammar             22  Injection           36  Words
  10  Averylongsearchss...  23  12345678901234567...  37  words
  11  Anotheryerylongss...  24  words             38  words   ⌐152
  12  12345678901234567890  25  words             39  words
  13  words               26  words For further explanation, press the H key (for HELP) and then the ENTER key.
```

FIG. 12

```
1, 3
                ⌐162
Synonyms for: INCOHERENCE
Enter synonym numbers to include in search and press ENTER (e.g., 1, 2,-3)

<=1>  Return to Search Options    <=2>  Return to Term Selection
                ⌐164
— — — — — — — — — — — — — Term Variations — — — — — — — — — — — — — — —
   1  incoherent
— — — — — — — — — — — — — — — — — — — — — — — — — — — — — — — — — —
   2  chaos              3  disconnection        4  discontinuity
   5  disjunction        6  disorder             7  illegibility
   8  incomprehensibility  9  lack of clarity   10  meaninglessness
  11  randomness        12  ranting             13  raving
  14  unclearness       15  unevenness          16  unintelligibility
  17  wandering
                              166
                                                        160

For further explanation, press the H key (for HELP) and then the ENTER key.
```

FIG. 13

```
                          SEARCH OPTIONS
Press ENTER to send search
To use a Search Option, enter an equal sign followed by the number.

Search Description:              ⌒112b
WHAT DIFFERENT METHODS OF "USABILITY TESTING" AND TQM
("CONTINUOUS IMPROVEMENT", "QUALITY FUNCTION DEPLOYMENT")
ARE USED BY SOFTWARE DEVELOPMENT COMPANIES?
                        ⌒122
Mandatory:    "USABILITY TESTING", TQM Restrictions: SATE (AFT 10/1/92), COURT (SIXTH CIRCUIT)
                         ⌒114      \142
<=1>  Enter/Edit Mandatory Terms   ⌒115             110
<=2>  Enter/Edit Restrictions (e.g., date)
<=3>  Thesaurus⌒116      ⌒117
<=4>  Edit Search Description       ⌒118
<=5>  Change number of documents  Current setting: 25

For further explanation, press the H key (for HELP) and then the ENTER key.
```

FIG. 14

```
Your FREESTYLE search has retrieved the top 44 documents based on
statistical ranking.  Search terms are listed in order of importance.
Terms after the * occurred too frequently to enhance your search.

"PUBLIC FIGURE" DEFINED PURPOSES DEFAMATION * FIRST CASE
                              ⌒172              173
Mandatory Terms: DEFAMATION

170

Press ENTER to view documents in KWIC or use Full, Cite, or Segment keys.
                                    ⌒174
<=1>  Browse documents in SuperKWIC (. SK)   ⌒175
<=2>  Location of search terms documents (. where)⌒176
<=3>  Number of documents with search terms (. why)
<=4>  Change document order (. sort)⌒177

For further explanation, press the H key (for HELP) and then the TRANSMIT key.
```

FIG. 15

```
              NUMBER OF DOCUMENTS WITH SEARCH TERMS (. why)
                184⎯⎯⎯\         186⎯⎯⎯\         188⎯⎯⎯\
                Documents       Documents       Term Importance
      182⎯⎯\    Retrieved       Matched         (0-100)
              ─ ─ ─ ─ ─ ─ ─ ─ ─ ─ ─ ─ ─ ─ ─ ─ ─ ─ ─ ─ ─ ─ ─ ─
       DEFAMATION    44              80             (M) Mandatory
      PUBLIC FIGURE  11              11             12
          DEFINED    22              26             8
         PURPOSES    29              51             5
       DEFAMATION    44              80             4
                A    ──              ──             ──

Total Retrived:   45
                                                   180

<=1>  Return to browse
      <=2>  Location of terms (. where)

For further explanation, press the H key (for HELP) and then the TRANSMIT key.
```

FIG. 16

```
              LOCATION OF SEARCH TERMS IN DOCUMENTS (. where)

Document numbers are listed accross the top of the chart.
      Terms are listed down the side in order of importance.
      Asterisks (*) indicate the existence of terms in documents.
      To view a document, enter the document number.                194⎯⎯⎯\
                                        1                   2
      192⎯⎯\                1 2 3 4 5 6 7 8 9 0 1 2 3 4 5 6 7 8 9 0 1 2 3 4 5
      FINISHED PRODUCT  |                                            * * *
        COMPONENT PART  |  *         *       * * * *
           NON RESIDENT |  * * *       * *       * * *         * * *       *
          MANUFACTURER  |  * * * *       * * *       * * *       *       * *     *     * *
               BRINGING |  *     * * *               *     * *     *     * * *
                  FORUM |  * * * * * * * *     *         * * * * * *
           INCORPORATED |  * *     * *   *     * * * * *         * *     *
                 PROPER |  * * * * * * * * * * * * *   *     * * * * * * * * *
                 ACTION |  * * * * * * * * * * * * * * *     * * * * * * * * *
             TENTH TERM |
      <=1>  Return to browse
      <=2>  Number of documents with terms (. why)           190
      Press the H key (for Help) and then the ENTER key.
```

FIG. 17

ASSOCIATIVE TEXT SEARCH AND RETRIEVAL SYSTEM HAVING A TABLE INDICATING WORD POSITION IN PHRASES

This is a continuation of U.S. patent application Ser. No. 08/155,304, filed Nov. 22, 1993.

FIELD OF THE INVENTION

This invention relates to the field of searching and retrieving text documents and more particularly to the field of using one or more computers to search a plurality of text documents in order to retrieve documents having particular terms and phrases.

BACKGROUND OF THE INVENTION

It is known that a large collection of text documents can be searched for particular keywords or phrases. A user can provide a single word or phrase or multiple words or phrases connected by Boolean connectors such as "AND" or "OR". However, in many cases, a user must be fairly sophisticated in order to perform searches of sufficient complexity in order to retrieve the exact class of documents that the user desires without having to perform an excessive number of searches.

Associative retrieval, a technique for information retrieval developed in the 1960s by Gerard Salton, addresses some of the shortcomings of Boolean searching. *Automatic Text Processing*, (published by Addison Wesley, New York, N.Y. 1988, and written by Gerard Salton) provides a description of associative retrieval searching. The basic formula used in associative retrieval involves calculating a term weight for each term within a search request, and scoring documents in a collection based on the sum of the weights for the search request terms that occur within the document. The two basic weighting factors are known as the term frequency—tf—and the inverse document frequency—idf.

The term frequency is defined as the number of times the term occurs within a given document. Hence, the term frequency must be calculated for each document within the collection.

The inverse document frequency is defined as the inverse of the number of documents in the entire collection which contain the term. Therefore, if df documents within a collection of N documents contain a given term, the idf would be 1/df. The idf can be normalized with respect to the number of documents by setting it to log(N/df). The idf is calculated for each search request term, but is constant for the collection and does not vary by document. The score for a given document is calculated by summing the product of the tf and the idfs for each search request term contained in the document.

However, there are many aspects of Associative Retrieval as described by Salton which render it impractical or unwieldy for large scale commercial use for searching and retrieving documents in large databases. Furthermore, most of the work done in the area of Associative Retrieval has failed to adequately address aspects relating to human interaction and feedback. It is desirable, therefore, to provide an associative text search and retrieval system that overcomes the deficiencies of known systems.

SUMMARY OF THE INVENTION

According to the present invention, a user provides a search description containing one or more search terms to an associative text search and retrieval system that searches a document database to retrieve documents containing at least one of the supplied search terms and then ranks each document using a ranking formula that varies according to the square of the term frequency of each of the search terms in the document. The ranking formula can also vary according to the inverse document frequency of each search term. The formula can also use a maximum term frequency to estimate the size of a document and the maximum document frequency to estimate the number of documents in a collection of documents, thus reducing the amount of processing needed to determine document size and the number of documents in a collection. The user can provide mandatory terms which cause the search to only return documents that contain those terms.

The system can employ a thesaurus to provide both synonyms and morphological variations of words. Phrases in the search description are detected using a table with a bitmap indicating possible positions of a word in a phrase and by using a tree having nodes corresponding to ID's associated with words in a phrase, the nodes being connected according to the order that the words can appear in a phrase. The system optimizes the search by distinguishing between noise words, which are not provided in an index for the documents, and frequently used terms, which are provided in the index but which are not used in the search.

The system can provide display options for the documents that are retrieved by the search, including displaying a window of text that contains the greatest number and diversity of search terms and mandatory terms. The system can also display a screen indicating which search terms are in which retrieved documents and can display a screen that indicates the importance of each term, which varies according to the inverse of the document frequency of each term. The documents can be sorted according to rank or according to a predetermined default method, such as reverse chronological order.

The system can include a plurality of interconnected processors and appropriate data therefore wherein some of the processors perform searches and others of the processors merge the search data and interact with the user.

BRIEF DESCRIPTION OF DRAWINGS

FIG. 8 is a screen illustrating entry of mandatory terms.

FIG. 9 is a screen illustrating entry of restrictions.

FIG. 10 is a screen illustrating displaying of restrictions.

FIG. 11 is a screen illustrating entry of both mandatory terms and restrictions.

FIG. 12 is a screen illustrating a thesaurus function.

FIG. 13 is a screen illustrating selection of synonyms and/or morphological variations of a term using the thesaurus function.

FIG. 14 is a screen illustrating mandatory terms, restrictions, and thesaurus entries.

FIG. 15 is a screen illustrating options for viewing documents retrieved after a search.

FIG. 16 is a screen illustrating a "why" function.

FIG. 17 is a screen illustrating a "where" function.

DETAILED DESCRIPTION OF DRAWINGS

Figure 1:
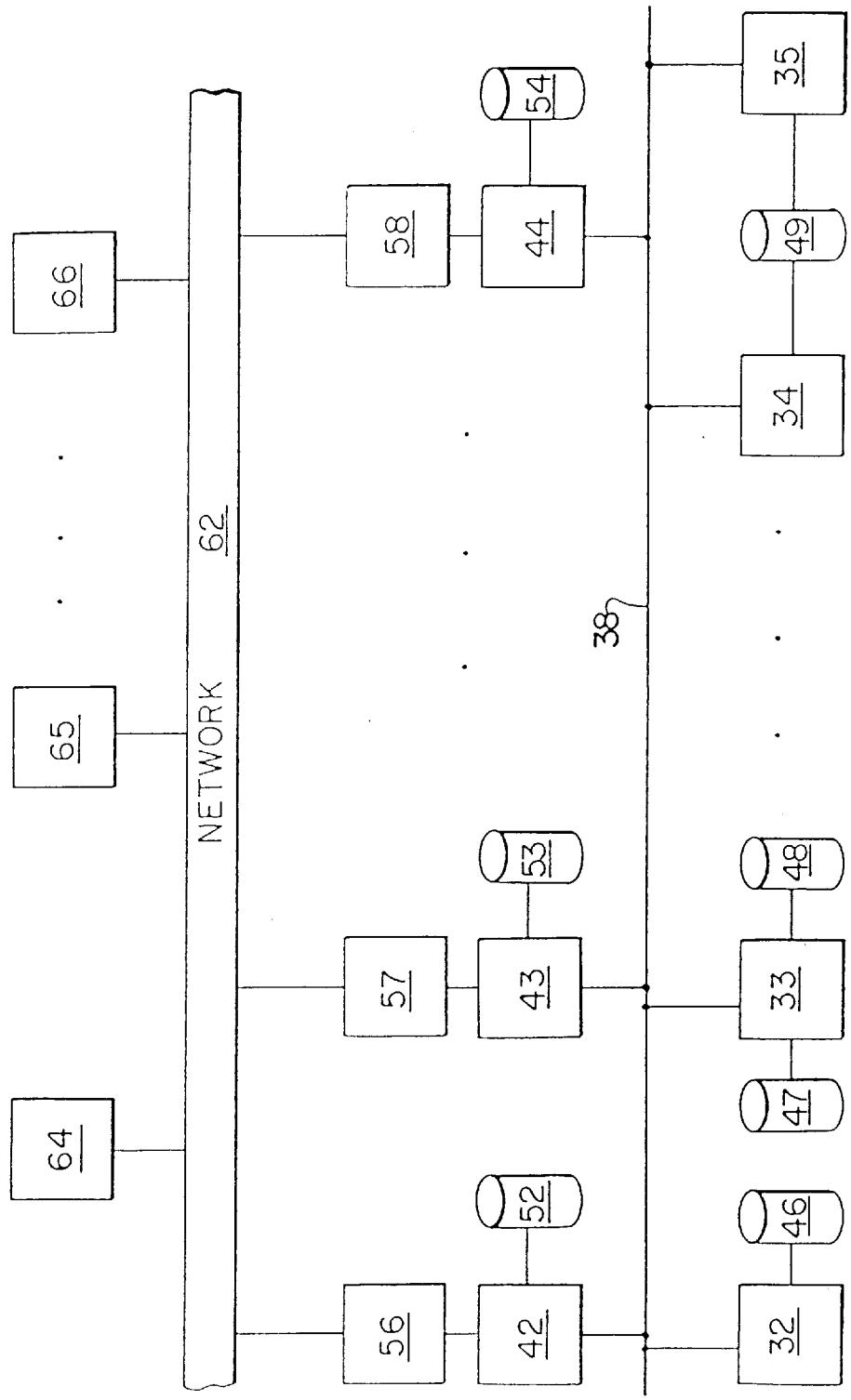
FIG. 1 is a schematic view of a document searching system according to the invention.

Referring to FIG. 1, a document search and retrieval system 30 allows a user to search a subset of a plurality of documents for particular key words or phrases and retrieves, for the user to view, documents that correspond to the search request. The system 30 comprises a plurality of Search and Retrieval (SR) computers 32–35 connected via a high speed interconnection 38 to a plurality of Session Administrator (SA) computers 42–44. Each of the SR's 32–35 is connected to one or more document collections 46–49, each containing text for a plurality of documents, indexes therefor, and other ancillary data. More than one SR can be provided access to a single document collection. Also, a single SR can be provided access to more than one document collection. The SR's 32–35 can be implemented using a variety of commercially available computers known to one of ordinary skill in the art, such as Model EX100 manufactured by Hitachi Data Systems of Santa Clara Calif.

Each of the SA's 42–44 is provided access to data representing phrase and thesaurus dictionaries 52–54. The SA's 42–44 can also be implemented using a variety of commercially available computers, such as Models 5990 and 5995 manufactured by Amdahl Corporation of Sunnyvale Calif. The interconnection 38 between the SR's and the SA's can be any one of a number of two-way high-speed computer data interconnections known to one of ordinary skill in the art, such as the Model 7200-DX manufactured by Network Systems Corporation of Minneapolis Minn.

Each of the SA's 42–44 is connected to one of a plurality of front end processors 56–58. The front end processors 56–58 provide a connection of the system 30 one or more commonly available networks 62 for accessing digital data, such as an X.25 network, long distance telephone lines, and SprintNet. Connected to the network 62 is a plurality of terminals 64–66 which provide user access to the system 30. The terminals 64–66 can be dumb terminals that simply process and display data inputs and outputs, or can be one of a variety of readily available stand-alone computers, such as an IBM or IBM-compatible Personal Computer. The front end processors 56–58 can be implemented by a variety of commercially available devices, such as Models 4745 and 4705 manufactured by the Amdahl Corporation of Sunnyvale Calif. Note that the number of components shown in FIG. 1 are for illustrative purposes only and that the system 30 described herein can have any number of SA's, SR's, front end processors, etc. Also, the distribution of processing described herein may be modified and may in fact be performed on a single computer without departing from the spirit and scope of the invention.

A user wishing to access the system 30 via one of the terminals 64–66 will use the network 62 to establish a connection, by means known to one of ordinary skill in the art, to one of the front end processors 56–58. The front end processors 56–58 handle communication with the user terminals 64–66 by providing output data for display by the terminals 64–66 and by processing terminal keyboard inputs entered by the user. The data output by the front end processors 56–58 includes text and screen commands. The front end processors 56–58 support screen control commands, such as the commonly known VT100 commands, which provide screen functionality to the terminals 64–66 such as clearing the screen and moving the cursor insertion point. The front end processors 56–58 can handle other known types of terminals and/or stand-alone computers by providing appropriate commands.

Each of the front end processors 56–58 communicates bidirectionally, by means known to one of ordinary skill in the art, with the particular one of the SA's 42–44 connected thereto. It is also possible to configure the system, in a manner known to one of ordinary skill in the art, such that one or more of the front end processors can communicate with more than one of the SA's 42–44. The front end processors 56–58 can be configured to "load balance" the SA's 42–44 in response to data flow patterns. The concept of load balancing is known to one of ordinary skill in the art.

Each of the SA's 42–44 contains an application program, described in more detail hereinafter, that processes search requests input by a user at one of the terminals 64–66 and passes the search request information on to one or more of the SR's 32–35 which perform the search and returns the results, including the text of the documents, to the SA's 42–44. The SA's 42–44 provide the user with text documents corresponding to the search results via the terminals 64–66. For a particular user session (i.e. a single user accessing the system via one of the terminals 64–66), a single one of the SA's 42–44 will interact with a user through an appropriate one of the front end processors 56–58.

Figures 2, 3:
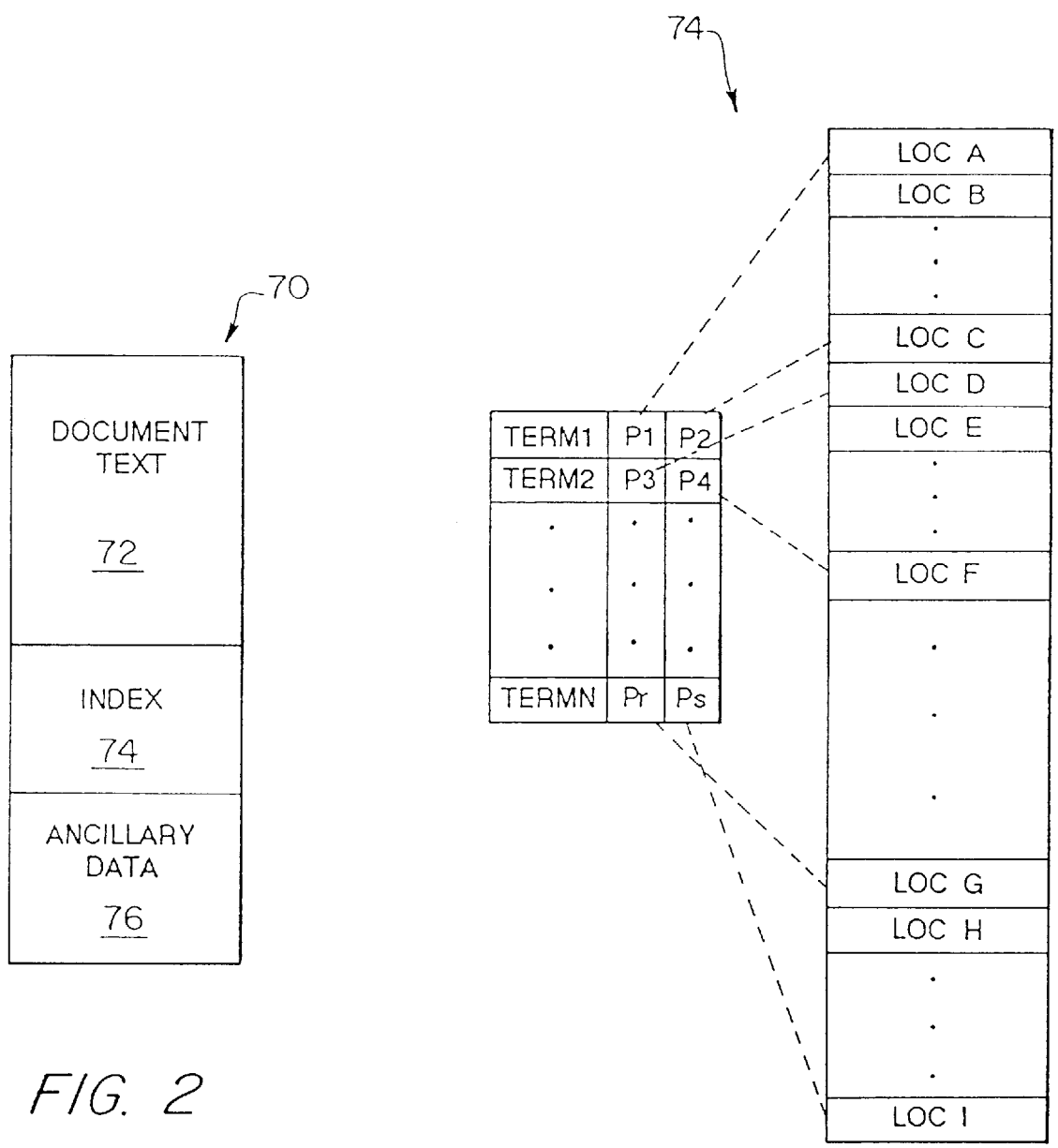
FIG. 2 illustrates data stored in a physical document collection.
FIG. 3 illustrates data stored in an index for a physical document collection.

Referring to FIG. 2, data 70 stored in each of the physical document collections 46–49 consists of document text 72, an index 74, and ancillary document information 76. The data 70 can be located in one or more files of a computer hard disk storage device. The document text 72 portion of the data 70 is comprised of character data representing text (such as ASCII or EBCDIC character data) for a plurality of documents. Each of the documents that are part of the document text 72 can be accessed individually. The index 74 contains a list of terms (words and phrases) that are present in all of the documents of the document text 72 along with the locations in the documents of those terms. The ancillary document information 76, described in more detail hereinafter, contains other information about the documents, such as the dates associated with the documents, the source of the documents, etc.

Referring to FIG. 3, the index 74 for a document collection comprises a plurality of entries that relate particular terms (term1—termn) to a plurality of locations (loc A–loc I). The table shown on the left-hand portion of FIG. 3 relates each term to a pair of pointers such that term1 is related to pointers P1 and P2, term2 is related to pointers P3 and P4, and termn is related to pointers Pr and Ps. The right-hand portion of FIG. 3 represents a list of all of the locations for all of the terms in the physical document collection. The pointers associated with each term point to the first and last locations in the list in order to correlate the terms in the text of the documents of the physical collection with the locations of the terms. For example, FIG. 3 shows term1 being located at locations loc A (pointed to by P1) through loc C (pointed to by P2) in the list. All of the locations in the list between the entry for loc A and the entry for loc C indicate separate locations for term1 in the document collection. Words and phrases which are so common as to be of little value in document searching, such as the word "of", are deemed "noise words" and are not included in the index. A list of noise words for each physical document collection is stored with the ancillary document information 76.

The SR's 32–34 search documents in a physical collection for particular terms by accessing the index 74. Terms in the search request are matched with terms in the index 74 in order to find specific documents in the document text 72 which contain the terms in the search request. Plural terms are depluralized and stored in their singular form. Terms that are submitted for a search are also depluralized. Depluralization is known in the art and is described in *Program*, Vol. 1, no. 3, pp. 130–137, Jul. 1980, which is incorporated by reference herein.

A user does not typically search all of the documents of the system 30, but rather, chooses a subset of the documents to be searched prior to conducting the search. The subset, deemed a logical document collection, corresponds to a particular class or group of documents having one or more common attributes. For example, all of the written opinions of the U.S. Supreme court can be a logical collection. As described in more detail below, a logical collection can correspond to a physical collection, can be a subset of a physical collection, can be made up of a plurality of physical collections, or can be made up of a plurality of subsets of physical collections.

Figure 4:
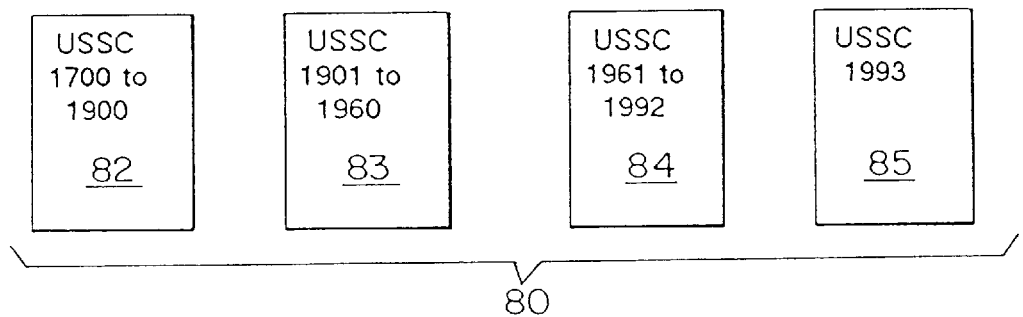
FIG. 4 illustrates a logical document collection comprised of a plurality of physical document collections.

Referring to FIG. 4, a logical document collection 80 of written opinions of the U.S. Supreme Court is comprised of four physical collections 82–85: opinions from 1700–1900, opinions from 1901–1960, opinions from 1961–1992, and opinions from 1993. As described above, each of the physical collections 82–85 is comprised of a text section and an index. If a user is searching all U.S. Supreme Court cases, then the particular SA that is interacting with the user will use a lookup table to determine which physical document collections correspond to the selected logical document collection. The lookup table correlates logical document collections with physical document collections. The SA then sends commands to the appropriate SR(s) to perform the search on the appropriate physical document collection(s) and return the results.

Figure 5:
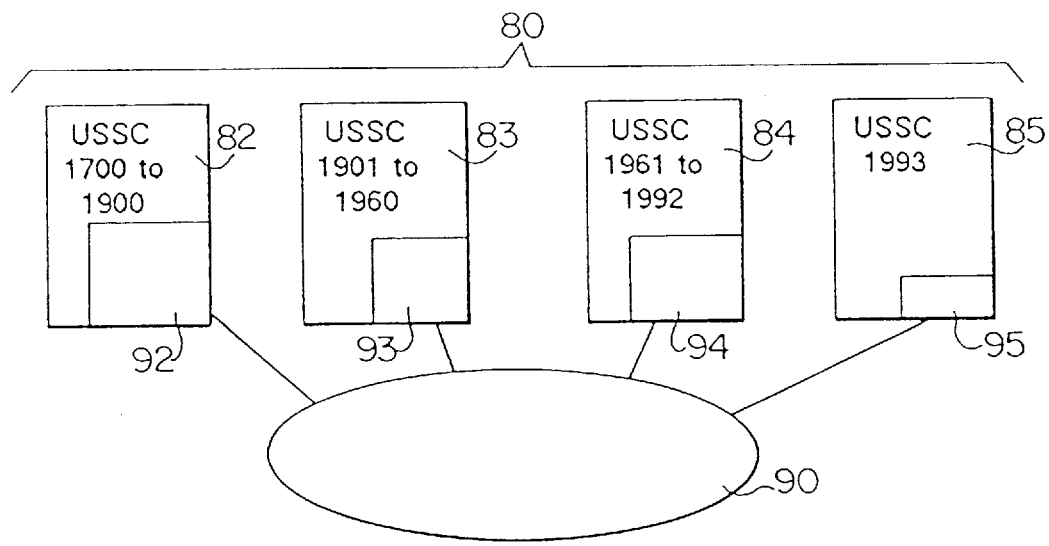
FIG. 5 illustrates a logical document collection comprised of a plurality of subsets of physical document collections.

Referring to FIG. 5, a logical document collection 90 represents written opinions of the U.S. Supreme Court that deal with tax issues. The logical document collection 90 does not physically exist by itself in a single location. Rather, the logical document collection 90 is comprised of a plurality of subsets 92–95 of the physical collections 82–85. The subset 92 corresponds to tax issue cases in the U.S. Supreme Court written opinions contained in the physical collection 82. Similarly, the subsets 93–95 respectively represent portions of the physical collections 83–85 that deal with tax issues.

If a user selects the logical collection 90 for searching, the SA that is interacting with the user determines the physical collections 82–85 for searching, as discussed above, and also provides instructions to the SR(s) for constructing a filter that will ensure that only documents that are part of the logical collection will be retrieved. A filter is a bitmap or a list of documents that indicates to an SR which documents are to be searched and which documents are to be ignored. The SR(s) use the filters in order to only return results that correspond to documents that are part of the logical collection. Filters can be constructed by the SR's using tables or by examining the ancillary document information 76. For the logical collection 90, filters will cause the search to only return documents corresponding to the subsets 92–95 of the physical collections 82–85.

Figure 6:
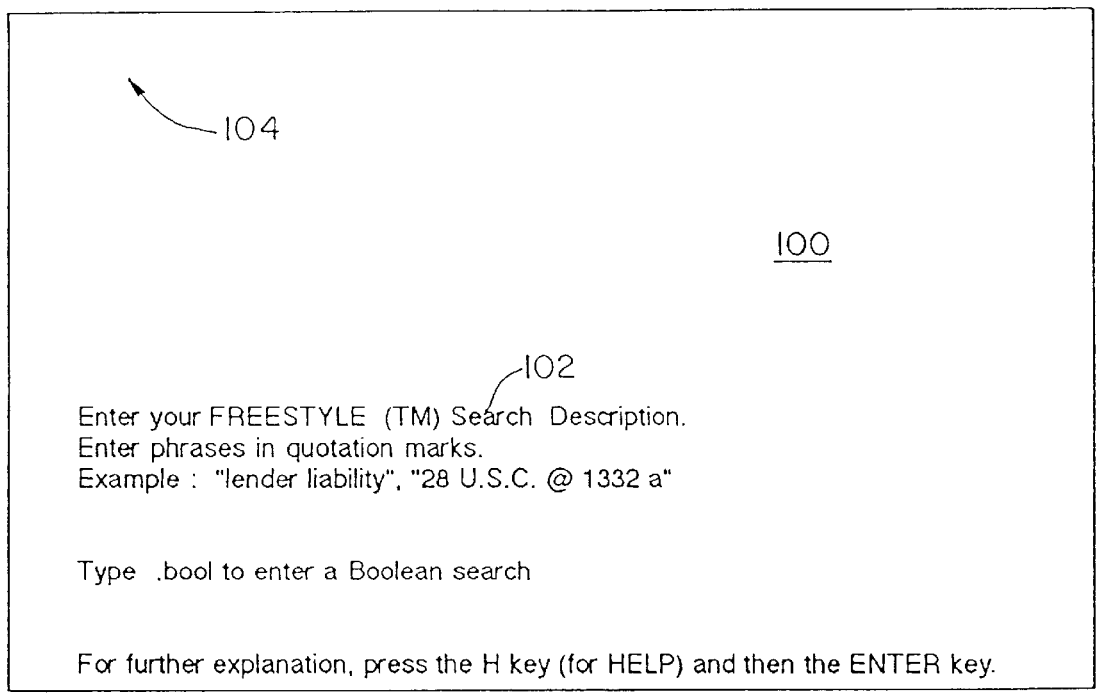
FIG. 6 is a screen illustrating entry of a search description.

Referring to FIG. 6, a user screen 100 illustrates input of a search request. The screen 100 is displayed on a user terminal. A prompt 102 on the screen 100 instructs the user to enter a search description. The user types a search description at the terminal keyboard into an area 104 of the screen 100. The description can include quotes around groups of words to provide phrases. The quotes indicate that the phrases should be searched as a single term rather than searching the words of the phrase separately. Individual instances of the words will not match the search. A user presses the <ENTER> key at the terminal to indicate that he has completed entering the search description.

The SA's 42–44 processes the search description by instructing the SR(s) to separately search the logical collection chosen by the user for each word in the description (with some exceptions, noted later). Each of the terms in the search description that are not noise terms are searched separately by the SR(s). A document containing at least one of the terms matches the search. Each matched document is then rated, as described in more detail below, and retrieved for the user to view.

Figure 7:
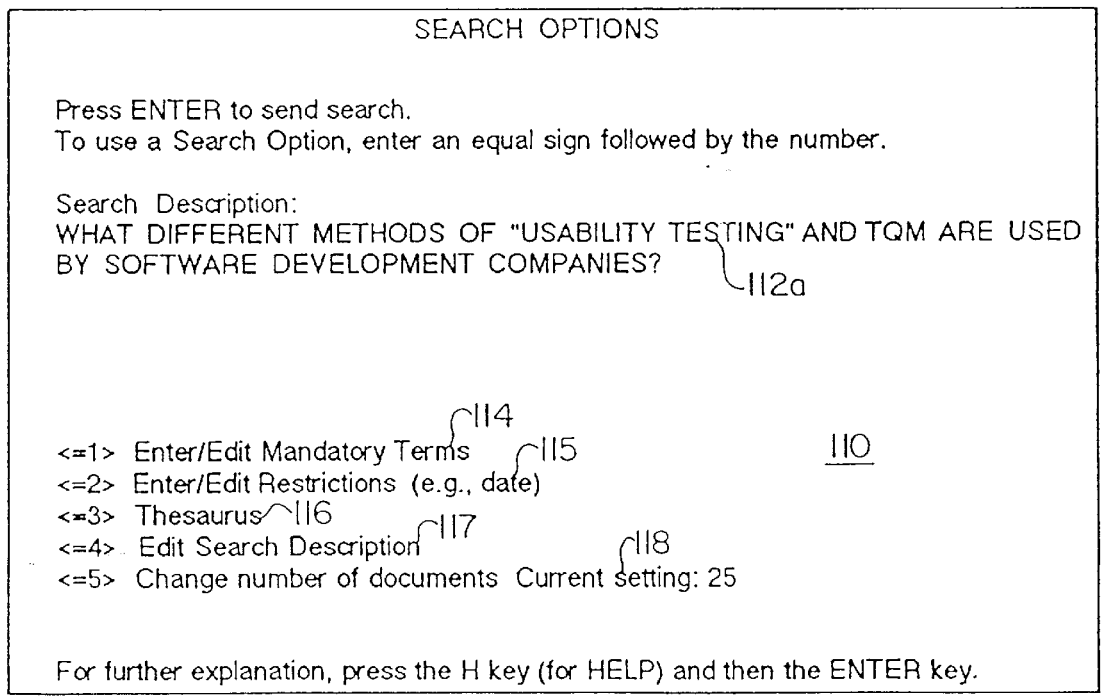
FIG. 7 is a screen illustrating entry of search options.

Referring to FIG. 7, a screen 110 is provided in response to the user entering a search description and pressing <ENTER>. The screen includes a search description 112a and a plurality of options 114–118. The first option 114 allows the user to Enter/Edit mandatory terms. The second option 115 allows the user to Enter/Edit restrictions. The third option 116 allows the user to use a thesaurus. The fourth option 117 allows the user to Edit the search description. The fifth option 118 allows the user to change the number of documents retrieved. Note that the order that the options 114–118 are presented on the screen is a design choice and that the options can be presented in any order without departing from the spirit and scope of the invention.

The options 114–118 allow the user to modify the characteristics of the documents retrieved by the search request. A user can select options repeatedly to modify the search before instructing the system to perform the search. The first, second, and third options 114–116 are described in more detail below. The fourth option 117 allows the user to modify the text of the search description 112a. The fifth option 118 allows the user to set the number of documents returned by the search. The number of documents returned by the search determines the maximum number of documents that the user will be able to view after conducting the search. The documents returned will be the ones with the highest ratings so that, for example, a setting of twenty-five will return to the user the twenty-five highest rated documents. Document rating is described in more detail below. Note that it is possible that the search can return a number of documents less than the number of return documents set using the fifth option 118 (including zero documents) if the number of documents that satisfy the search requirements is less than the number set by the fifth option 118.

Referring to FIG. 8, the screen 110 is shown after the user has selected the first option 114 for entering mandatory terms. A mandatory term is a term that must be in the document for the document to be returned on the search. Without entering one or more mandatory terms, the search returns documents that contain at least one term of the search description. If the user desires that all documents returned on the search contain at least one occurrence of a particular term or terms, then he selects the first option 114 and enters the mandatory terms at the terminal keyboard. In the screen 110 shown in FIG. 8, the user has indicated at a line 122 that the terms "TQM" and "usability testing" are mandatory terms. Therefore, all documents returned by the search are guaranteed to contain both the term "TQM" and the term "usability testing". Mandatory terms are implemented using filters similar to the filters used to construct logical document collections, discussed above.

It is not necessary that a mandatory term be part of the search description. The user can provide mandatory terms that are not part of the search description. Mandatory terms that are not part of the search description are not used in document ranking (described in detail hereinafter) but are used for other features which will be discussed herein.

Referring to FIG. 9, a screen 130 is provided in response to the user selecting the second option 115 for entering restrictions. The screen 130 shows a plurality of restrictions 132–136 that can be selected by the user. A restriction is a constraint on the documents returned by the search. For example, the first restriction 132 is a date restriction that indicates that the date of the documents that are returned by the search will be before or after a particular date. Note that the restrictions illustrated for the screen 130 are for a particular type of logical collection (written court opinions). For other types of logical collections and other types of documents, it may be appropriate to provide other types of restrictions for the user to select.

Referring to FIG. 10, the screen 110 is shown after restrictions have been entered. A line 142 on the screen 110 shows that, for this example, the documents returned on the search will be written opinions from the sixth circuit only and that all documents will have a date later than Oct. 1, 1992. The SA uses the restrictions to instruct the SR's to construct filters (as described above). The filters ensure that only documents meeting the requirements imposed by the restrictions are returned by the search.

Referring to FIG. 11, the screen 110 is shown with both the line 122 for mandatory terms and the line 142 for restrictions, thus illustrating that a user can enter both restrictions and mandatory terms for a search. Note that in this case, the SA will instruct the SR to build filters for both the mandatory terms and the restrictions.

Referring to FIG. 12, a screen 150 is provided in response to the user selecting the third option 116 (thesaurus) from the screen 110 shown in FIG. 7. Terms 152 from the search description are listed on the screen 150. The user views the terms 152 from the search description and selects term numbers 154 for which equivalent terms are desired.

Referring to FIG. 13, a screen 160 is provided to a user after the user selects the terms of the search description for which equivalent terms are desired. A portion 162 of the screen 160 shows the term from the search description. Another portion 164 of the screen 160 shows morphological variations of the term. A morphological variation of a word is a different form of the same word. For example, "condition", "conditioner", "conditioning", and "conditioned" are all morphological variations of each other. Another portion 166 of the screen 160 shows synonyms for the term from the search description. The user can choose any number and combination of morphological variations and synonyms from the screen 160. The thesaurus function is implemented using a lookup table that contains both synonyms and morphological variations which is stored as shown in FIG. 1 (elements 52–54), described above.

Referring to FIG. 14, the screen 110 is shown with the mandatory term line 122, the restrictions line 142 and a search description 112b that contains equivalents (shown in parenthesis) for some of the terms in the search description 112b. The equivalents are provided by the user after he has selected the third (thesaurus) option 116 and provided selected equivalent terms for particular terms in the search description 112b.

Referring to FIG. 15, a screen 170 is provided after completion of the search. Note that the mandatory term line 122 and the restriction line 142 are part of the screen 170. A term line 172 shows terms of the search description listed in order of term importance is. Term importance discussed in more detail hereinafter. Note also that the term line 172 contains an asterisk followed by two terms 173 "FIRST" and "CASE". The asterisk indicates that the terms which follow are "frequently used terms". Any terms that are deemed frequently used terms are eliminated from further processing for the search because their value in locating the desired documents is deemed minimal.

For the search illustrated by the screen 170, the two terms 173 "FIRST" and "CASE" were deemed frequently used terms and hence were not searched. The ancillary data 76, shown in connection with FIG. 3, contains a table of frequently used terms for each physical document collection. The determination as to which terms go into the table is based on a variety of functional factors known to one of ordinary skill in the art, including, but not limited to, the frequency of occurrence of a term in the physical collection and the relationship between the meaning of a term and the nature of the document collection. Note that this mechanism is different from the "noise words", discussed above, since noise words aren't even listed in the index for the physical document collection. Frequently used terms are listed in the index. Furthermore, noise words are completely eliminated from the search description and will not be seen on the screen after completion of the search. Also note that if a frequently used term is a word, it will not be eliminated if it is part of a phrase. Phrases are discussed in more detail herein.

The screen 170 also contains a plurality of view options 174–177. Note that the order that the options 174–177 are presented on the screen is a design choice and that the options can be presented in any order without departing from the spirit and scope of the invention. Also, other viewing options that are not shown by one of the prompts 174–177, such as an option to cite the retrieved documents, may be available to the user by typing in the appropriate command to execute the option. The first option 174 allows the user to view a "SuperKWIC" window of the document. The second option 175 provides a screen which shows the user the location of the search terms in the documents. The third option 176 brings up a screen that indicates to the user why certain documents were chosen. The fourth option 177 provides the user with an opportunity to change the order that the retrieved documents are presented. By default, the retrieved documents are presented in ranked order (document ranking is described in more detail hereinafter).

By choosing the fourth option 177, the user can provide that the documents be presented in a different order, such as chronological order and/or from highest court to lowest court in the case of written court opinions. Each physical document collection has associated therewith, in the ancillary information data 76, predetermined information indicating how the documents can be presented. The predetermined information is based on a variety of functional factors known to one of ordinary skill in the art and varies according to the nature of a particular document collection.

The "SuperKWIC" window is a text window where the user can view the most indicative portion of the document based on the occurrences and diversity of mandatory terms and search terms. A text window is a viewable contiguous portion of a document having a particular length, such as, for example, fifteen lines. For each text window, a superkwic score is calculated and the window having the highest score becomes the SuperKWIC window. The score of a window is calculated as follows: For each search term and/or mandatory term in the window, the score is incremented by one. (Note that, as discussed above, a mandatory term is not necessarily a term of the search description.) For each search term and/or mandatory term in the window preceded by a different search term and/or mandatory term, the score is incremented by two. For each search term and/or mandatory term in the window that is preceded by a different search term and/or mandatory term which is itself preceded by yet a different search term and/or mandatory term, the score is again incremented by two.

Referring to FIG. 16, a screen 180 shows the result of choosing the third (why) option 176 illustrated in FIG. 15. A first column 182 of the screen 180 lists the terms of the search description. The terms are listed in order of term importance (discussed in detail below). A second column 184 shows the number of documents that were retrieved (returned for the search) that contain each term from the column 182. A column 186 shows the total number of documents that were examined that contain each term listed in the column 182. A column 188 shows the term importance of each of the terms listed in the column 182. Calculation of term importance is discussed in more detail below.

The terms listed in the column 182 are listed in order of term importance. At the top of the column 182 are mandatory terms (in this case, the term "DEFAMATION"). Following the mandatory terms are terms in decreasing order of importance, as shown in the column 188. At the bottom of the list are frequently used terms, which, as discussed above, are not part of the search. Note that the frequently used term "A" in column 182 shows "--" in the columns 184,186,188.

Referring to FIG. 17, a screen 190 is provided in response to a user selecting the second option (where) 175 shown in FIG. 15. The screen contains a column 192 that lists all of the search terms. A row 194 lists the retrieved document numbers (in this example the first through the twenty-fifth document). For each document that is returned by the search, the screen 190 indicates which terms were present in which documents by placing an asterisk in the column corresponding to a particular document and the row corresponding to a particular term. The absence of an asterisk in a particular row and column combination indicates that the document corresponding to the particular column does not contain the term corresponding to the particular row.

Figure 18:
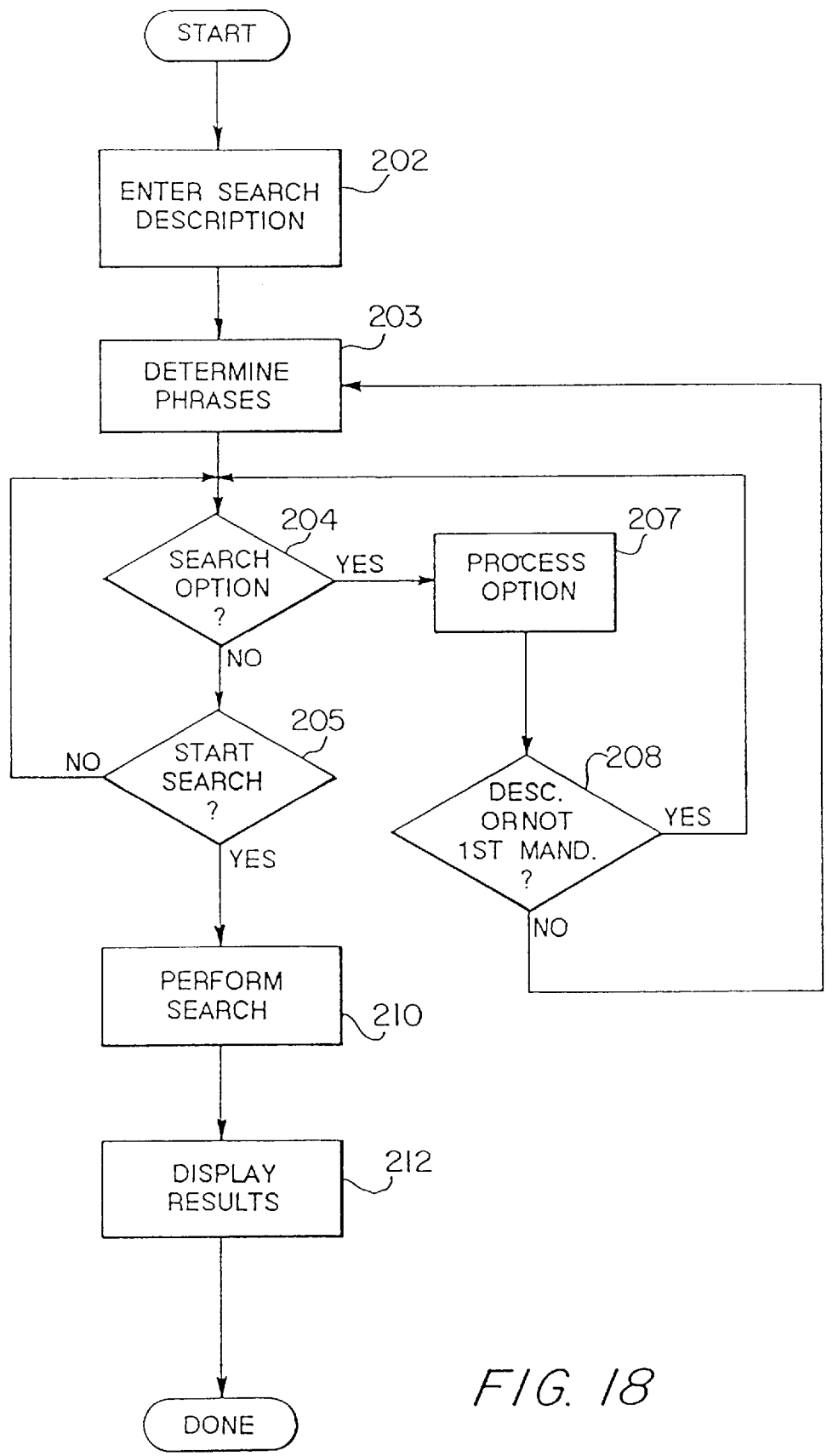
FIG. 18 is a flowchart illustrating overall operation of the system according to the invention.

Referring to FIG. 18, a flowchart 200 illustrates the high level flow of the software. At a first step 202, the user enters a search description. Following the first step 202 is a second step 203 for determining phrases. At the step 203, phrases in the search description are detected. Phrases are groups of words that are most meaningful when searched as a group rather than individually, such as the phrase "product liability". The subsequent search is performed only on the detected phrases rather than on the individual words that make up the phrases. Phrase detection is described in more detail hereinafter.

After the step 203 is a test step 204 where a determination is made as to whether the user has provided a search option (i.e. one or more restrictions, mandatory terms, etc.) as described above. If the user has not provided a search option, control passes from the step 204 to another test step 205 where a determination is made as to whether the user has requested that the search be performed. For the embodiment of the invention illustrated herein, the user indicates a desire to perform a search by pressing the <ENTER> key without providing a search option. If the user has not requested that a search be performed, then control passes from the step 205 back to the step 204.

If the user has provided a search option at the step 204, control passes from the step 204 to a step 207 where the user option selection is processed, as described in detail above. Following the step 207 is a test step 208 where a test is made to determine if the option entered by the user is a modification of the search description or is not the first entry of a mandatory term. If so, control passes from the step 208 back to the step 204 in order to process more user inputs. Otherwise, control passes from the step 208 back to the step 203 in order to detect any additional phrases entered by the user prior to processing additional inputs at the step 204. Phrases are not detected after editing the description or after entering mandatory terms (except the first time) because the user may be selecting those options in order to circumvent automatic phrase detection.

If at the step 205 the user has indicated a desire to perform the search, control passes from the step 205 to a step 210 where the search is performed. The search procedure is described in more detail hereinafter. Following the step 210 is a step 212 where the search results are displayed, as described above.

Figure 19:
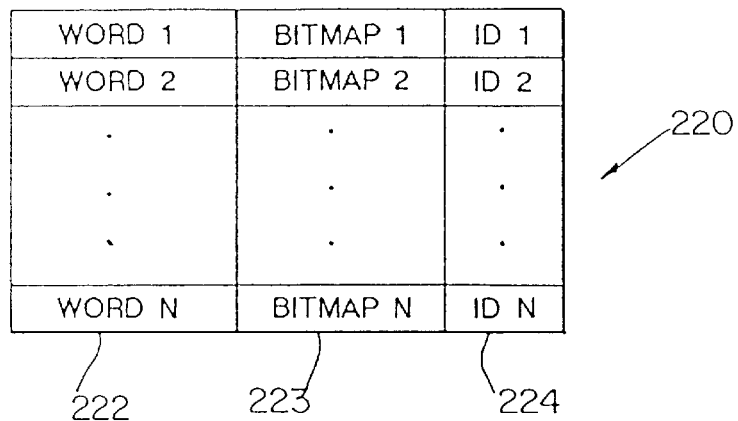
FIG. 19 shows a table used to detect phrases.

Referring to FIG. 19, a table 220 is used to detect phrases. The table 220 contains entries for each word 222 that could be part of a phrase, a bitmap 223 indicating possible locations in a phrase of the associated word entry 222, and an ID 224 used for compressing the representations for each of the words by assigning a unique arbitrary number to represent each word. The table 220 is indexed by the word entries 222.

The bitmap entries 223 for each word indicate which positions the word could appear in a phrase. Each bitmap entry 223 is one byte (eight bits) long. A value of one at a particular bit position in the bitmap entry 223 indicates that the word 222 associated with the bitmap 223 could appear in the corresponding position in a phrase. Conversely, a value of zero in a particular position indicates that the word 222 could not appear at the same position in a phrase. For example, if a bitmap entry 223 for a word 222 contains a one bit in the first, third, and sixth bit positions and contains zero bits in all of the other positions, then the associated word 222 could be part of a phrase only if the word were the first, third, or sixth word of the phrase.

Figure 20:
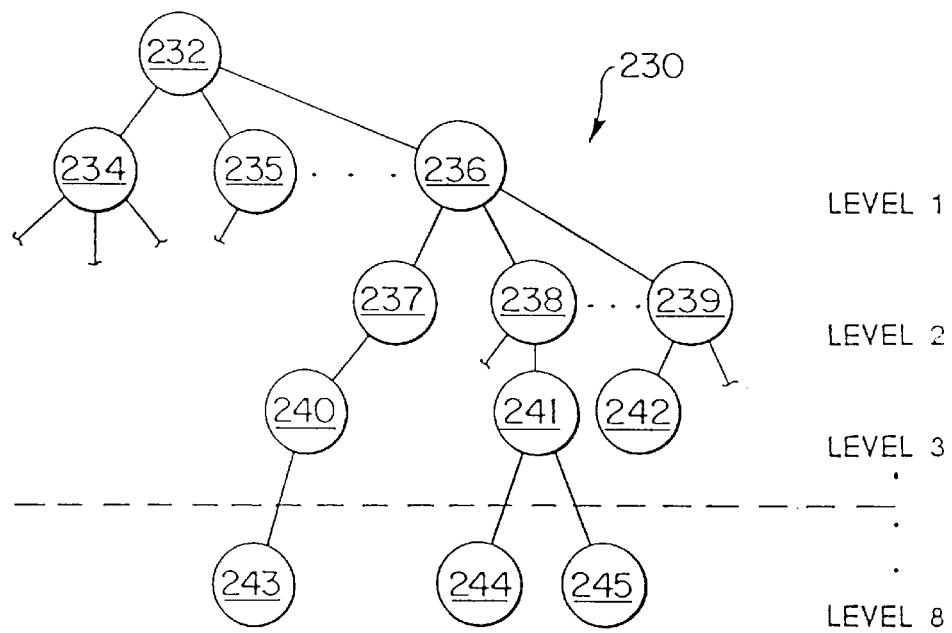
FIG. 20 shows a tree data structure used to detect phrases.

Referring to FIG. 20, a diagram of a tree structure 230 shows a root node 232, a plurality of level one nodes 234–236, a plurality of level two nodes 237–239, a plurality of level three nodes 240–242, and a plurality of level eight nodes 243–245. The break between level three and level eight represents a plurality of level four, level five, level six and level seven nodes that are part of the tree structure 230 but are not shown in FIG. 20. Each of the nodes corresponds to one of the ID's 224 from the table 220 of FIG. 19.

Each of the level one nodes 234–236 represents the first word of a phrase. Each of the level two nodes 237–239 represents the second word of a phrase. Generally, each of the level N nodes represents the Nth word in a phrase. Connections between the nodes represent the traversal of successive words in a phrase. A terminal node represents the last word in a phrase. Note that in the embodiment illustrated herein, all level eight nodes are terminal nodes, thus allowing the bitmap entries (described above) to be only one byte in length. In order to save memory space, the tree structure 230 is stored using the ID's 224 shown in FIG. 19 rather than using the actual words.

Figure 21:
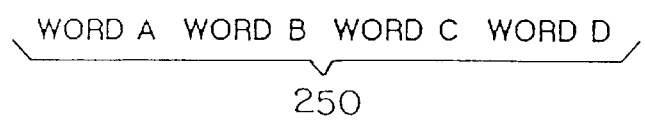
FIG. 21 shows a plurality of contiguous words from a search description.

Referring to FIG. 21, a successive group of words from the user-supplied search description can be examined for phrases. Initially, wordA is first examined by looking up wordA in the table 220 of FIG. 19 in order to obtain the bitmap entry therefor. If the bitmap entry for wordA indicates that wordA could never be the first word of a phrase (by having a zero in the first bit position), then wordA is deemed to be not part of a phrase. Otherwise, the ID entry corresponding to wordA is used to locate the level one node in the tree structure 230 corresponding to wordA.

Next, wordB is examined. If wordA is not part of a phrase, then wordB is examined in the same manner as wordA had been examined. Otherwise, wordb is examined by first checking the corresponding bitmap entry to see if wordB could be the second word of a phrase. If not, then wordA is deemed not to be part of a phrase and wordB is examined in the same manner as the previous examination of wordA. If, on the other hand, wordB could be the second word of a phrase, then the level one node corresponding to wordA is examined to see if it connects to a level two node corresponding to wordB. If not, then wordA is deemed to be not part of a phrase and wordB is examined in the manner that wordA had been previously examined. Otherwise, wordA and word B are deemed to be the first two words in a phrase and processing continues with wordC.

If wordC is found not to be part of the phrase, then the phrase consists of wordA followed by wordB and processing continues by testing if wordC is the first word of a new phrase. Otherwise, if wordC is found to be the third word of the phrase that begins with wordA and wordB, then processing continues by testing if wordD could be the fourth word of the phrase. As each complete phrase is detected, the word after the detected phrase is examined to determine if the word after the detected phrase could be the first word of a new phrase.

As discussed above in connection with FIG. 2 and FIG. 3, the indices for the physical document collections can contain phrases stored as a single term. For phrases not stored as a single term, it is possible to search words of the phrase separately. For example, the phrase "personal injury" can be searched by merging a search for the term "personal" and with a search for the term "injury" and then determining where the term "personal" precedes the term "injury" by one location in each of the documents.

Figure 22:
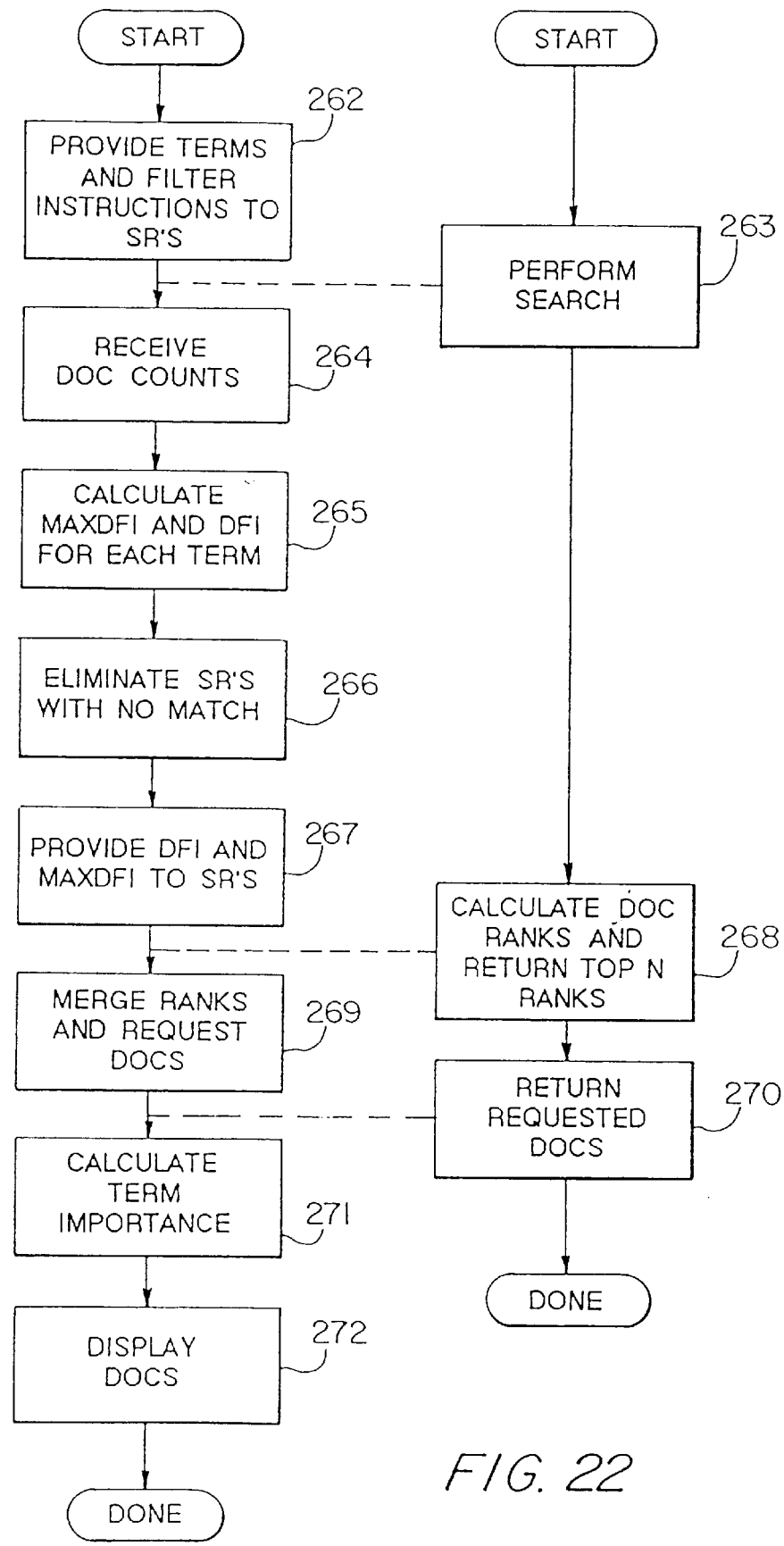
FIG. 22 is a flowchart illustrating operation of a search algorithm.

Referring to FIG. 22, a flowchart 260 illustrates the search process. Steps shown on the left-hand side of the flowchart 260 represent steps that are executed by the SA while steps shown on the right-hand side of the flowchart 260 represent steps executed by one or more SR's that perform the actual search and retrieval. The dotted lines connecting steps on the left-hand side with steps on the right-hand side indicate the temporal relationship between steps executed by the SA and steps executed by the SR's. The flowchart 260 does not indicate dataflow between the SA's and the SR's.

Processing begins at a first step 262 where the SA provides the search terms and instructions for the filters to the SR's. Note that, as discussed above, the SA forms a logical collection of documents, selected by the user, by determining the appropriate physical collections and by providing the instructions to construct the appropriate filters. Other filter instructions can be provided in response to the user entering mandatory terms or restrictions.

Following the step 262 is a step 263 where the SR's that are part of the search each perform the low level search by accessing the indices of the physical collections that comprise the selected logical collections as discussed above. Following the step 263, the SA's receive document counts from the SR's at a step 264. Document counts are the number of documents that contain each of the terms. Therefore, if there are a total of N terms being searched, there will be N document count values. Also at the step 263, the SR(s) return an indicator for any frequently used terms (described above) that will be eliminated from further consideration.

Following the step 264 is a step 265, where for each search term, the SA calculates dfi and maxdfi. The quantity dfi represents the number of documents that contain term i. The quantity maxdfi represents the maximum number of documents in which any of the terms of the search appear. Therefore, for any search, there is only a single value for maxdfi. Note that the SA calculates dfi and maxdfi since a user's logical document collection may comprise a plurality of physical collections at different SR's. No single SR could calculate dfi and maxdfi without knowing the document counts provided by the other SR's.

Following the step 265 is an optimization step 266 where any SR's which do not contain a single document that matches any of the search terms are eliminated from further consideration. That is, an SR, which is part of a physical document collection that comprises the user's selected logical collection, is eliminated from further processing if the SR does not contain any relevant documents.

Following the step 266 is a step 267 where dfi and maxdfi, calculated by the SA at the step 264, are provided to the SR's. Following the step 267 is a step 268 where each of the SR's calculates the rank of each document that was located at the search step 263. The rank of each document is determined by the following summation formula:

$$\sum_{i=1}^{nt} \left( \frac{ut}{nt} \right) \left( \frac{\log(tfi+1)^2}{\log(\text{max}tfi+1)} \right) \left( \log\left( \frac{1+\text{max}dfi}{dfi} \right) \right) (\log(oc))$$

where nt is the total number of search terms, ut is the number of those terms that occur in the document being ranked (each distinct term is counted once), and tfi is the number of times term i occurs in the document being ranked. The quantity oc represents the percentage of occurrences of search terms in a document floating text window containing the maximum number of search terms and is calculated by dividing the number of occurrences of search terms in the window by the total number of occurrences of search terms in the document and then multiplying the result by one hundred. The quantities dfi and maxdfi are discussed above. All logs are in base two. Note that the quantity log(tfi+1) is squared in the formula, thus weighting the ranking in favor of documents having the greatest term frequency.

At the step 268, each of the SR's returns to the SA the ranking for the top ranked N documents where N is the number of documents that the user requested to be returned on the search. The number of retrieved documents is set by the user in the manner described in detail above.

Following the step 268, the SA executes the step 269 where all of the document rankings returned by the SR's are merged and sorted by rank. All but the documents having the top N ranks, where N is the number of documents requested by the user, are eliminated from further consideration. The SA then requests the remaining documents from the appropriate SR(s). For example, if the user requests twenty-five documents, and if the logical document collection spans three SR's, then each of the three SR's would return twenty-five document rankings. The SA would merge the three sets of twenty-five document rankings each, sort them by rank, and then eliminate from consideration all but the top twenty-five documents. The SA would then request that the appropriate SR(s) return the top ranked documents.

Following the step 269 is a step 270, executed by the SR, where the SR(s) retrieve and return to the SA the top ranked documents requested by the SA at the step 269.

Following the step 270 is a step 271, executed by the SA, where the term importance for each of the terms is calculated. The term importance, which is discussed above in connection with the column 188 of FIG. 16, equals $\log_2$ (maxdfi/dfi), normalized so that the values of term importance range from one to one hundred.

Following the step 271 is a step 272 where the documents are displayed, as discussed in detail above.

What is claimed:

1. A method of operating an associative text search and retrieval system, comprising the steps of:

allowing a user to provide a plurality of search terms;

using a table to detect phrases within the search terms provided by the user, the table containing entries which, for each word that can be part of a phrase, indicate a position that the word can occupy in any phrase;

performing a search of text documents using the plurality of search terms provided by the user and the phrases, if any, detected by the table;

calculating a score for each of the text documents containing at least one of the search terms;

ranking the text documents based on their scores; and providing the user with a predetermined number of retrieved documents that are a subset of the text documents based on the documents' ranks.

2. A method of operating an associative text search and retrieval system, according to claim 1, wherein the table has a bitmap associated with each entry, the bitmap indicating possible locations in a phrase of the associated entry.

3. A method of operating an associative text search and retrieval system, according to claim 2, wherein each bitmap entry is one byte long, a value of one at a particular bit position in the bitmap entry indicates that the word associated with the bitmap could appear in the corresponding position in a phrase, and a value of zero at a particular bit position in the bitmap entry indicates that the word associated with the bitmap could not appear in the corresponding position in a phrase.

4. A method or operating an associative text search and retrieval system, according to claim 2, wherein the table further has an ID for compressing the representations of each of the words by assigning a unique arbitrary number to represent each word.

5. A method of operating an associative text search and retrieval system, according to claim 4, wherein the table uses a tree having nodes corresponding to the ID's associated with words in a phrase, the nodes being connected according to the order that the words can appear in a phrase.

6. An associative text search and retrieval system, comprising:

front end processing means for interacting with a network having one or more user terminals connected thereto to allow a user to provide information to the system and receive information from the system;

storage means for storing a plurality of text documents;

processor means, coupled to the front end processing means and the storage means, for performing a search of the text documents using a plurality of search terms provided by the user, for calculating a score for each of the text documents containing at least one of the search terms, for ranking the text documents based on their scores, and for providing to the front end processing means a predetermined number of retrieved documents that are a subset of the text documents based on the documents' ranks; and a table used to detect phrases, the table containing entries which, for each word that can be part of a phrase, indicate a position that the word can occupy in any phrase.

7. An associative text search and retrieval system, according to claim 6, wherein the table has a bitmap associated with each entry, the bitmap indicating possible locations in a phrase of the associated entry.

8. An associative text search and retrieval system, according to claim 7, wherein each bitmap entry is one byte long, a value of one at a particular bit position in the bitmap entry indicates that the word associated with the bitmap could appear in the corresponding position in a phrase, and a value of zero at a particular bit position in the bitmap entry indicates that the word associated with the bitmap could not appear in the corresponding position in a phrase.

9. An associative text search and retrieval system, according to claim 7, wherein the table further has an ID for compressing the representations of each of the words by assigning a unique arbitrary number to represent each word.

10. An associative text search and retrieval system, according to claim 9, wherein the table uses a tree having nodes corresponding to the ID's associated with words in a phrase, the nodes being connected according to the order that the words can appear in a phrase.

11. An associative text search and retrieval system, comprising:

front end processing means for interacting with a network having one or more user terminals connected thereto to allow a user to provide information to the system and receive information from the system;

storage means for storing a plurality of text documents;

processor means, coupled to the front end processing means and the storage means, for performing a search of the text documents using a plurality of search terms provided by the user, for calculating a score for each of the text documents containing at least one of the search terms, for ranking the text documents based on their scores, and for providing to the front end processing means a predetermined number of retrieved documents that are a subset of the text documents based on the documents' ranks, the retrieved documents having higher ranks than text documents not provided to the front end processing means, wherein the ranks are calculated using a formula that varies according to the square of the frequency in each of the text documents of each of the search terms; and a table used to detect phrases, the table containing entries which, for each word that can be part of a phrase, indicate a position that the word can occupy in any phrase.

12. An associative text search and retrieval system, according to claim 11, wherein the table has a bitmap associated with each entry, the bitmap indicating possible locations in a phrase of the associated entry.

13. An associative text search and retrieval system, according to claim 12, wherein each bitmap entry is one byte long, a value of one at a particular bit position in the bitmap entry indicates that the word associated with the bitmap could appear in the corresponding position in a phrase, and a value of zero at a particular bit position in the bitmap entry indicates that the word associated with the bitmap could not appear in the corresponding position in a phrase.

14. An associative text search and retrieval system, according to claim 12, wherein the table further has an ID for compressing the representations of each of the words by assigning a unique arbitrary number to represent each word.

15. An associative text search and retrieval system, according to claim 14, wherein the table uses a tree having nodes corresponding to the ID's associated with words in a phrase, the nodes being connected according to the order that the words can appear in a phrase.

\* \* \* \* \*

UNITED STATES PATENT AND TRADEMARK OFFICE
CERTIFICATE OF CORRECTION

PATENT NO. : 5,771,378
DATED : June 23, 1998
INVENTOR(S) : John Holt, David James Miller, Stephen M. Sever, Franz Weckesser It is certified that error appears in the above-identified patent and that said Letters Patent is hereby corrected as shown below:

Title page, item [75], delete the following inventors:
    X. Allan Lu, Springboro; Ray Daley; Minh Doan, both of Dayton; Richard G. Graham, Beavercreek; Catherine Leininger, Dayton; Darin W. McBeath, Miamisburg; Thomas Pease, Mason; Dale Waddell, Dayton.

Signed and Sealed this

Fifteenth Day of September, 1998

*Attest:*

BRUCE LEHMAN

*Attesting Officer*     *Commissioner of Patents and Trademarks*